Figure 1:
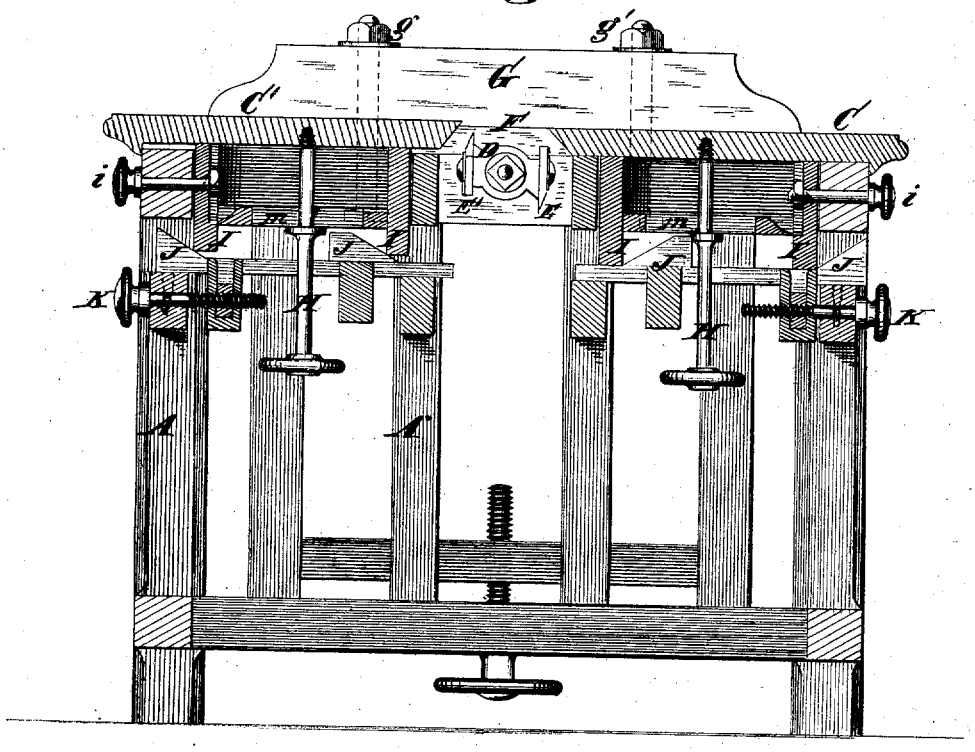

3 Sheets--Sheet 1.

H. CLIMER & J. D. RILEY

H. CLIMER & J. B. MANNIX, Adm'rs.

Planing-Machines.

No. 6,109. Reissued Nov. 3, 1874.

Attest
Henry Millward
Wm. L. McConnel

Inventors
Henry Climer and
J. B. Mannix adm. of the
estate of J. D. Riley deceased
By F. Millward attorney

THE GRAPHIC CO. PHOTO-LITH. 39 & 41 PARK PLACE, N.Y.

3 Sheets--Sheet 2.

H. CLIMER & J. D. RILEY.

H. CLIMER & J. B. MANNIX, Adm'rs.

Planing-Machines.

No. 6,109. Reissued Nov. 3, 1874.

Inventors
Henry Climer and
J. B. Mannix adm of the estate of
J. D. Riley deceased
By L. Millward
Attorney.

Attest
Henry Millward
B
Wm. E. McCord

THE GRAPHIC CO. PHOTO-LITH. 39 & 41 PARK PLACE, N.Y.

3 Sheets--Sheet 3.
H. CLIMER & J. D. RILEY.
H. CLIMER & J. B. MANNIX, Adm'rs.
Planing-Machines.
No. 6,109. Reissued Nov. 3, 1874.
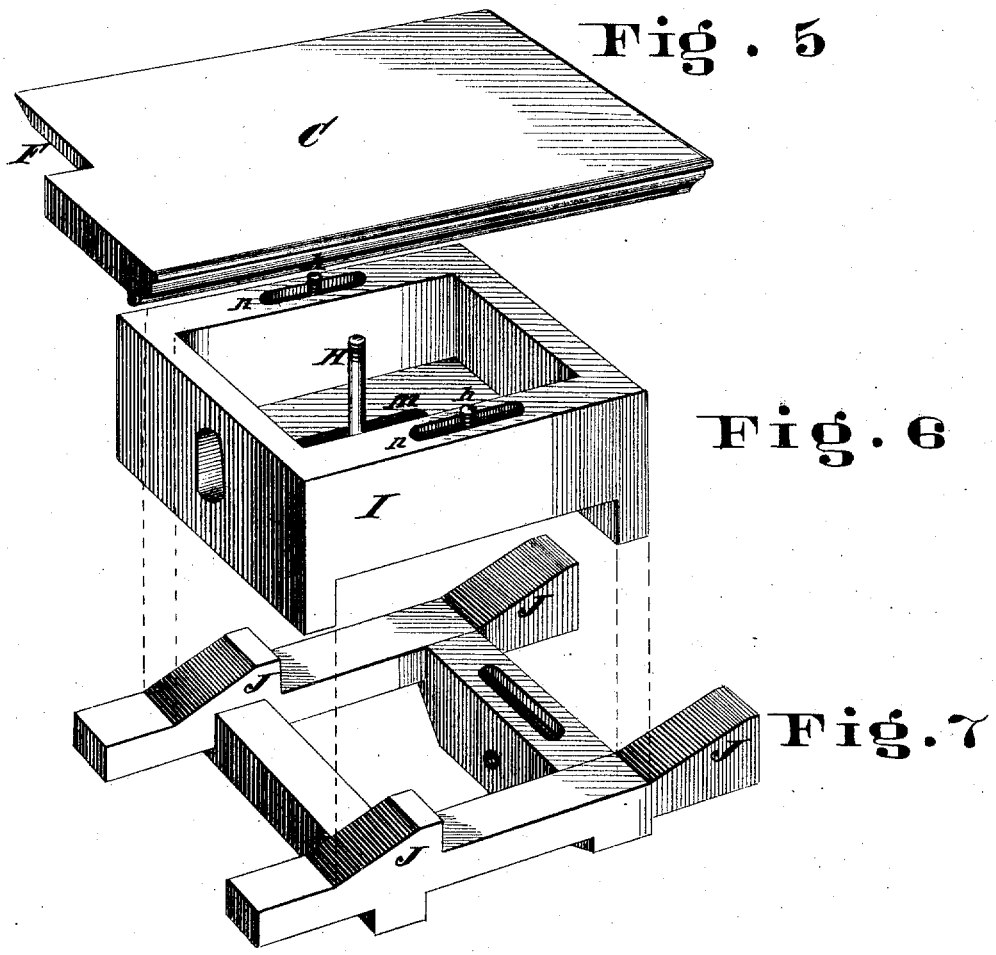
Attest
Henry Millward
Wm. L. McGuad
Inventors
Henry Climer and
John B. Mannix adm of the estate of
J. D. Riley deceased
By F. Millward
Attorney
THE GRAPHIC CO. PHOTO-LITH. 39 & 41 PARK PLACE, N.Y.

UNITED STATES PATENT OFFICE.

HENRY CLIMER, OF MUSCATINE, IOWA, AND JOHN B. MANNIX, OF CINCINNATI, OHIO, ADMINISTRATOR DE BONIS NON OF JOHN D. RILEY, DECEASED; SAID CLIMER AND RILEY ASSIGNORS, BY MESNE ASSIGNMENTS, OF PART INTEREST TO McBETH, BENTEL & MARGEDANT, OF HAMILTON, OHIO.

IMPROVEMENT IN PLANING-MACHINES.

Specification forming part of Letters Patent No. 59,966, dated November 27, 1866; reissue No. 6,109, dated November 3, 1874; application filed May 14, 1872.

*To all whom it may concern:*

Be it known that HENRY CLIMER, now of Muscatine, Iowa, and JOHN D. RILEY, of Cincinnati, Hamilton county, State of Ohio, did invent certain Improvements in Planing-Machines, of which the following is a specification:

This invention relates to that class of machines for planing wood in which the cutter-head is hung upon an overhung mandrel projecting between two tables, as contradistinguished from that class of machines in which the cutter placed between two tables is carried upon bearings upon both sides of the machine between said tables.

The first part of the invention consists in the provision, in connection with a planing-machine, of beds for supporting the work, which are so constructed, connected, and operated that they are capable of independent vertical adjustment, in such a manner that the horizontality of the same can be preserved at all times while under the act of and after adjustment; the object of this part of the invention being to provide for the regulation of the thickness of shaving, or depth of the cut, without necessitating the leveling of the bed or beds after adjustment, and without changing the location of the beds longitudinally.

The second part of the invention consists in the combination, in a planing-machine, of a cutter-head and beds for supporting the work, constructed and operated in the manner substantially as hereinafter described, to admit of adjustment to and from the cutter longitudinally without changing the vertical position; the object being to enable the operator to adjust the nose or inner edge of his bed or work-table so close to the cutter-head that the work is fully supported near the point of cutting action, while the vertical position of the beds during the operation of longitudinal adjustment is not disturbed.

The third part of the invention consists in a combination of three elements in connection with a planing-machine, to wit: first, a bed on which the work is supported; second, a frame on which the bed rests and moves for adjustment; third, an inclined-plane slide for elevating the frame and bed, all constructed, &c.; the object of this part of the invention being to combine, in a simple compact manner, the independent device for elevating the bed and the independent device for adjusting it to and from the cutter.

The fourth part of the invention consists of devices for rigidly securing the adjustable beds after adjustment.

Figure 2:
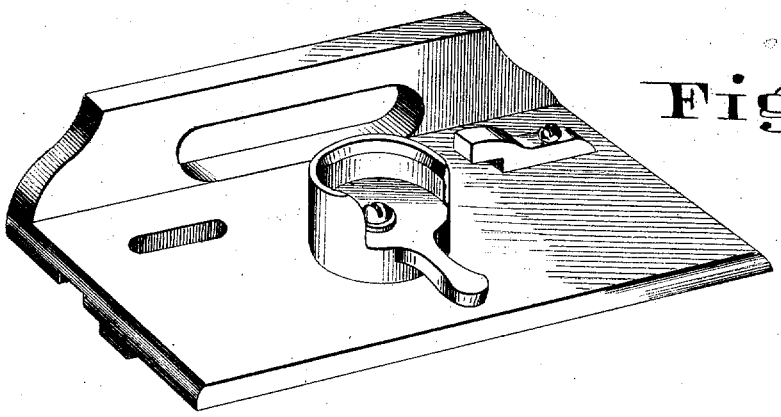
Figure 3:
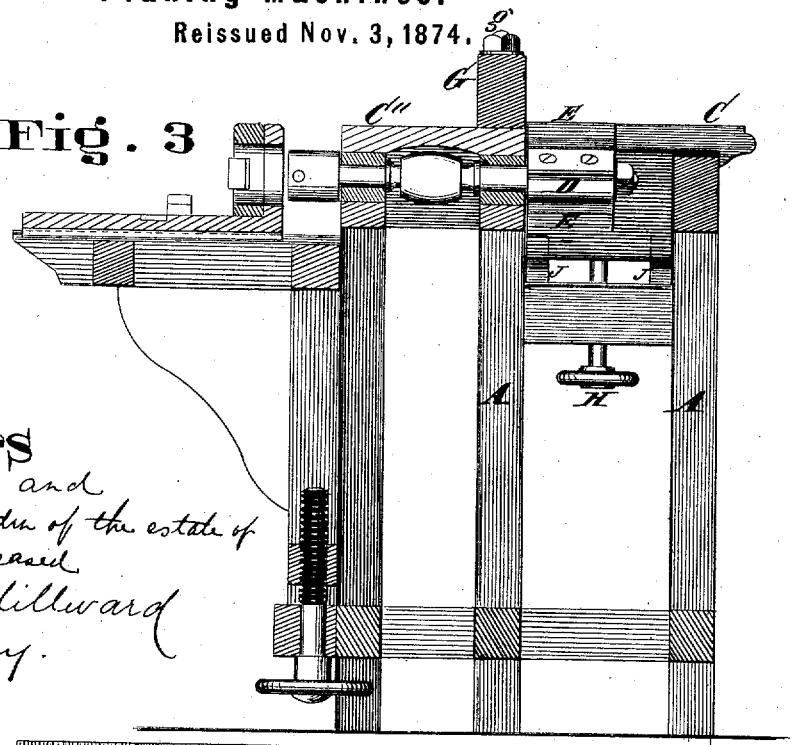
Figure 4:
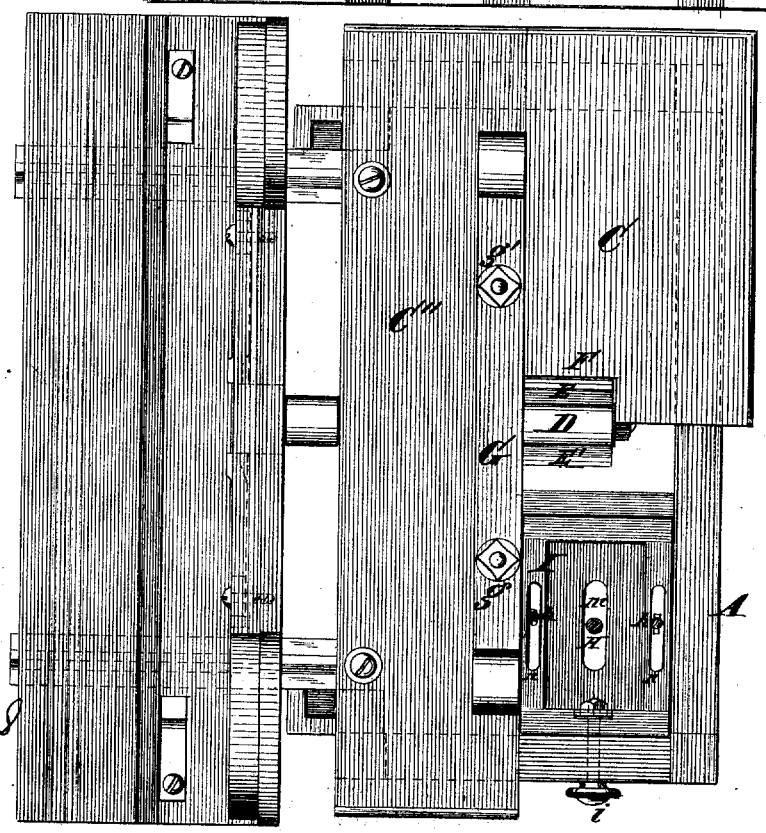

Figure 1 is a vertical section of the machine through the adjustable beds. Fig. 2 is a perspective view of a table employed in this machine for the support of work to be bored or mortised. Fig. 3 is a vertical section of the entire machine through the axial plane of the mandrel. Fig. 4 is a plan of the machine, partly in section. Fig. 5 is a perspective view of one of the adjustable beds. Fig. 6 is a perspective view of the vertically-adjustable frame, upon which the adjustable bed shown in Fig. 5 is supported. Fig. 7 is a perspective view of the adjustable inclined-plane slide, which elevates the frame and bed shown in Figs. 6 and 5, respectively.

In the drawings, A is the frame of the machine. C C′ are two beds, on which the material to be planed is supported, and fed by hand. D is the planing-head, provided with bits or cutters E E′, and journaled in suitable bearings in the frame of the machine. A rotary motion is given to it in any convenient manner. The beds C C′ in use are adjusted with such relation to the cutter-head that one is set to support and present the work properly to the cutters, and the other to receive and support the same after the cut, so that the work is firmly supported both before and after the cut. This precise adjustment is accomplished by the vertical movement of the beds C C′. The head D is overhung, having no outer bearing to support it. Between the two beds C C′ an opening, F, is provided for the planing or cutter head. C″ is a stationary bed, supporting the detachable fence G, which is placed square with beds C and C′, and forms a side guide for the work. When the fence is detached, the three tables may, by reason of the adjustability of the tables C C′, be arranged in the same or different horizontal planes. H H are set-screws or tightening-bolts, connecting with the beds C C′, and passing through slots *m m* in the frame I I, on which the beds rest. The heads of the screws or bolts H H press against the under side of the frames I I, and serve to secure in any position the beds C C′.

By slacking or removing the screws H H, the beds C C′ may be set up in close contact with the cutters, or be allowed to slide backward, so that access may be had to the head for removal, change of cutters, or sharpening. Beneath the frames I I are two inclined-plane slides, J J, into the cross-bars of which the set-screws or adjusting-screws K K are tapped, the said set-screws passing through the frame of the machine, in which they are permitted to revolve, but not move longitudinally, being retained in place by the pin and groove. By operating said screws K K, the incline-plane slides are brought nearer to or farther from the center of the machine, causing the frames I I to be elevated or depressed in a vertical line, and thereby either or both of the beds C C′ may be raised or lowered, the action of the incline planes and the motion of frames I I being such that the beds C C′ are elevated or depressed without disturbing in the least their horizontality. The beds, therefore, do not need leveling after adjustment. If it is desired to cut off, in the operation of planing, a shaving of a certain thickness, one of the beds, as C′, is located or adjusted to the height of the cutters, and the other depressed the thickness of said shaving. The piece to be planed is then placed upon the bed C, and fed by hand to the cutting-knives, which remove the desired thickness of shaving. The piece passing on the bed C′ has thereby a solid bearing on both beds. In order to prevent any possible movement of the beds C C′ after adjustment the fastening-screws *i* are provided, which rigidly secure the frames I I to the frame A of the machine. The independent vertical adjustability of the beds C C′ (when the horizontality of the same is preserved during the act of and after adjustment by the same device which adjusts them without disturbing their location longitudinally) provides for the convenient adjustment of the location of the beds with relation to the top of the cutter to regulate the thickness of shaving. By reason of the two movements of the table C C′—viz., the vertical movement and the longitudinal movement, each movement being wholly independent of the other—the machine (when only one of its tables is so operated) is enabled to perform a great variety of work, and a still greater variety of work can be accomplished by adapting the machine to adjust the plane of both its beds with relation to the center of the spindle of cutter-head. The two independent movements of either table C C′ also permit them to be raised or lowered with relation to the cutter, while the inner edge of the table can be always set at the same distance from the path of the cutters. If it were not for the longitudinal movement of the bed the edge of it would be at varying distances from the cutters in its motion up and down. Screws *h* through slots *n* serve as guides for the movement of the tables C C′.

We claim—

1. In a wood-planing machine, in combination with the overhung cutter-head, tables C C′, placed on opposite sides thereof, one being adjustable in different parallel planes by a direct vertical movement, and also adjustable longitudinally without change of plane, substantially as set forth.

2. In a planing-machine, in combination, two tables placed on opposite sides of the overhung cutter, both of which are independently adjustable in parallel planes.

3. In a planing-machine, the combination of two tables on opposite sides of the overhung cutter, which are longitudinally adjustable in relation thereto by sliding each in its own plane, substantially as set forth.

4. In a planing-machine, the combination of two tables on opposite sides of the overhung cutter, which are independently adjustable, both longitudinally and vertically, substantially in the manner set forth.

5. In a planing-machine, the combination of the frame I, which has only a vertical movement, and a table which has a vertical movement in parallel planes with the said frame, and a longitudinal movement in a horizontal plane on said frame to and from the cutters, and parallel with the axis on which they rotate.

6. In combination with the cutters, tables C C′ on each side thereof, and frames I I and incline planes J J, for adjusting the tables in parallel planes, substantially as set forth.

In testimony of which invention we hereunto set our hands.

HENRY CLIMER.
J. B. MANNIX,
*Adm'r de bonis non est John D. Riley, dec'd.*

Witnesses for CLIMER:
W. B. LANGRIDGE,
THO. D. SMITH.
Witnesses as to J. B. MANNIX:
STEPHEN COLES,
EZRA KEENAN.